United States Patent
Kobayashi et al.

(10) Patent No.: US 8,628,845 B2
(45) Date of Patent: Jan. 14, 2014

(54) HEAT RAY SHIELDING GLASS AND MANUFACTURING METHOD OF THE SAME

(75) Inventors: Hiroshi Kobayashi, Ichikawa (JP); Kenichi Fujita, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 441 days.

(21) Appl. No.: 12/654,926

(22) Filed: Jan. 8, 2010

(65) Prior Publication Data
US 2010/0203322 A1  Aug. 12, 2010

(30) Foreign Application Priority Data

Feb. 9, 2009  (JP) .................................. 2009-027206
Dec. 7, 2009  (JP) .................................. 2009-277682

(51) Int. Cl.
*B32B 5/16*  (2006.01)

(52) U.S. Cl.
USPC ........................................................ 428/323

(58) Field of Classification Search
USPC ........................................................ 428/323
See application file for complete search history.

(56) References Cited

U.S. PATENT DOCUMENTS 7,238,418 B2 * 7/2007 Fujita ............................ 428/328
2004/0028920 A1 * 2/2004 Fujita et al. .................... 428/458

FOREIGN PATENT DOCUMENTS

| JP | A-04-160041 | 6/1992 |
| JP | A-08-217500 | 8/1996 |
| JP | A-08-259279 | 10/1996 |
| JP | A-10-297945 | 11/1998 |
| JP | A-2001-089202 | 4/2001 |
| JP | A-2004-338963 | 12/2004 |
| WO | WO 2005/087680 A1 | 9/2005 |

* cited by examiner

*Primary Examiner* — Elizabeth A Robinson
(74) *Attorney, Agent, or Firm* — Oliff & Berridge, PLC

(57) ABSTRACT

A heat ray shielding laminated glass is provided, with an intermediate layer having a heat ray shielding performance interposed between opposed two plate glasses. Wherein an intermediate layer having the heat ray shielding performance is obtained by being cured by irradiation of ultraviolet ray, after a dispersion of composite tungsten oxide particles is dissolved into an ultraviolet ray curing resin precursor (E) and thereafter is filled in a gap between the opposed two plate glasses.

14 Claims, No Drawings

HEAT RAY SHIELDING GLASS AND MANUFACTURING METHOD OF THE SAME

BACKGROUND

1. Technical Field

The present invention relates to a laminated glass and a manufacturing method of the same widely applied to window materials of buildings, and window materials of automobiles, trains, and airplanes, and more specifically relates to the heat ray shielding laminated glass and the manufacturing method of the same not requiring high temperature/high pressure processing by an autoclave, which can be manufactured under a room temperature, and using composite tungsten oxide particles and/or hexaboride particles having low haze and excellent design property, while having an excellent heat ray shielding performance.

2. Description of Related Art

A safety glass applied to window materials of automobiles, etc, is proposed, for the purpose of reducing a cooling load and a human heat feeling, by interposing a heat ray shielding film between plate glasses and shielding a solar energy that enters from this glass.

For example, patent document 1 discloses a laminated glass in which a soft resin layer containing a heat ray shielding metal oxide composed of tin oxide or indium oxide with particle size of 0.1 μm or less is interposed between a pair of plate glasses. Patent document 2 discloses a laminated glass in which an intermediate layer with metals of Sn, Ti, Si, Zn, Zr, Fe, Al, Cr, Co, Ce, In, Ni, Ag, Cu, Pt, Mn, Ta, W, V, Mo, oxide, nitride, and sulfide of them or doped objects of Sb and F or composite materials of them dispersed therein, is provided between at least two plate glasses. Patent document 3 discloses a laminated glass for automobiles in which ultrafine particles composed of $TiO_2$, $ZrO_2$, $SnO_2$, $In_2O_3$, and glass fiber composed of organosilicon or organosilicon compound are interposed between transparent plate-like members. Patent document 4 proposes a laminated glass in which an intermediate layer composed of three layers is provided between at least two transparent glass plate-like bodies, and metals of Sn, Ti, Si, Zn, Zr, Fe, Al, Cr, Co, Ce, In, Ni, Ag, Cu, Pt, Mn, Ta, W, V, Mo, oxide, nitride, and sulfide of them and doped objects of Sb and F or composite materials of them are dispersed in a second layer of the intermediate layer, with the intermediate layer between the first layer and the third layer set as a resin layer.

However, in the inventions of patent documents 1 to 4, large quantities of particles having heat ray shielding performance need to be added, to secure the heat ray shielding performance. As a result, there is a problem that a visible light transmission performance is deteriorated, with an increase of an addition of the particles having the heat ray shielding performance. However, if the addition of the particles having the heat ray shielding performance is reduced, although the visible light transmission performance is increased, the heat ray shielding performance is deteriorated this time. After all, there is a problem that it is difficult to simultaneously satisfy the heat ray shielding performance and the visible light transmission performance.

Under such a background of the technique, the following two kinds of heat ray shielding laminated glasses are already disclosed by inventors of the present invention.

(1) Patent document 5 discloses the heat ray shielding laminated glass formed by interposing the intermediate layer having the heat ray shielding performance between two plate glasses, wherein the intermediate layer is constituted of a vinyl resin intermediate film containing hexaboride particles alone, or hexaboride particles and ITO particles and/or ATO particles.

(2) Patent document 6 discloses the heat ray shielding laminated glass, with a heat ray shielding film containing the aforementioned particles formed therein, and further having vinyl resin as an intermediate film between the aforementioned two plate glasses.

Further, patent document 7 discloses the heat ray shielding laminated glass formed by interposing the intermediate layer having the heat ray shielding performance between two plate glasses, wherein the intermediate layer contains particles of the composite tungsten oxide expressed by a general formula $M_xW_yO_z$ (wherein W is tungsten, O is oxygen, satisfying $0.001 \leq x/y \leq 1$, $2.0 \leq z/y \leq 3.0$) and vinyl resin.

(Patent document 1)
Japanese Patent Laid Open Publication No. 08-217500
(Patent document 2)
Japanese Patent Laid Open Publication No. 08-259279
(Patent document 3)
Japanese Patent Laid Open Publication No. 04-160041
(Patent document 4)
Japanese Patent Laid Open Publication No. 10-297945
(Patent document 5)
Japanese Patent Laid Open Publication No. 2001-89202
(Patent document 6)
Japanese Patent Laid Open Publication No. 2004-338963
(Patent document 7)
WO2005/87680

The heat ray shielding laminated glass having the intermediate layer containing composite tungsten oxide particles and hexaboride particles between two plate glasses is manufactured by kneading dispersion liquid of the composite tungsten oxide particles and hexaboride particles, a plasticizer, and a vinyl resin by using an extruder, a plastograph, a kneader, a Banbury mixer, and a Calendar roll, etc, then sheet-like molding them by an extrusion method, a Calendar method, and a press method, etc, to thereby obtain the heat ray shielding intermediate film, and interposing the heat ray shielding intermediate film between two plate glasses, with the heat ray shielding intermediate film subjected to processing at high temperature and under high pressure by using the autoclave. In the heat ray shielding laminated glass, the composite tungsten oxide or the hexaboride particles are not formed into aggregates but are set in a state in which a uniform dispersability is maintained. As a result, a satisfactory heat shielding laminated glass having an excellent heat shielding performance and a low haze value, can be obtained.

Here, the inventors of the present invention achieves a technique that by replacing the vinyl resin between two glass plates with ultraviolet ray curing resin, a kneading operation by using the aforementioned extruding machine, plastograph, kneader, Banbury mixer, and Calendar roll, etc, and a sheet-like molding operation by using the extrusion method, Calendar method, and press method, etc, and a operation at high temperature under high pressure, can be omitted, thus making it possible to improve productivity and reduce a production cost.

However, when the vinyl resin between the two glass plates is replaced with ultraviolet ray curing resin, a new problem is found out.

Namely, when the composite tungsten oxide particles or the hexaboride particles are dispersed into the laminated glass manufactured by irradiation of ultraviolet ray after an ultraviolet ray curing resin precursor is filled between two glass plates, a new problem is found out. Specifically, this new problem is that although the laminated glass manufactured by the aforementioned method and finally obtained has an excellent heat ray shielding function, haze (cloudiness) becomes higher and the design property is deteriorated. Here, from the viewpoint of design property, it is a matter of course that a low haze is requested even in the laminated glass.

SUMMARY OF THE INVENTION

The present invention is provided under such a circumstance, and a problem to be solved is to provide the laminated glass in which the ultraviolet ray curing resin with the composite tungsten oxide particles and/or the hexaboride particles dispersed therein, is filled between the glass plates, having a low haze value and the excellent design property while having the excellent heat ray shielding function.

Strenuous efforts are performed by the inventors of the present invention for the purpose of solving the above-described problem. As a result, a dispersion of the composite tungsten oxide particles (A1) and/or the hexaboride particles (A2) is obtained by the steps of:

obtaining slurry by dispersing composite tungsten oxide particles (designation mark "(A1)" is assigned thereto in some cases for convenience in this specification.) and/or hexaboride particles (designation mark "(A2)" is assigned thereto in some cases for convenience in this specification.) into a hydrocarbon solvent (designation mark "(B)" is assigned thereto in some cases for convenience in this specification.);

obtaining a dispersion liquid of the composite tungsten oxide particles (A1) and/or the hexaboride particles (A2), with each surface coated with a polymer compound (C) having the ester group, by adding to the slurry the polymer compound (designation mark "(C)" is assigned thereto in some cases for convenience in this specification.) having the ester group, and thereafter pulverizing the polymer compound;

obtaining a dispersion of the composite tungsten oxide particles (A1) and/or the hexaboride particles (A2), by adding a deflocculating agent (designation mark "(D)" is assigned thereto in some cases for convenience in this specification.) to the dispersion liquid, and thereafter vaporizing the hydrocarbon solvent (B) from the dispersion liquid; and pulverizing a dispersion of the composite tungsten oxide particles (A1) and/or the hexaboride particles (A2) in parallel to vaporizing the hydrocarbon solvent (B) or after vaporizing the hydrocarbon solvent (B), wherein a mixing ratio of the ester-based polymer compound (C) and the deflocculating agent (D) is set in a prescribed range, and the dispersion of the composite tungsten oxide particles (A1) and/or the hexaboride particles (A2) is dissolved into an ultraviolet ray curing resin precursor (designation mark "(E)" is assigned thereto in some cases for convenience in this specification.), and the ultraviolet ray curing resin precursor is then filed between two plate glasses, which is then irradiated with ultraviolet ray, thereby providing the laminated glass without requiring high temperature/high pressure processing by an autoclave, capable of being manufactured at a room temperature, and having low haze and excellent design property while having excellent heat ray shielding function. Thus, the present invention is completed.

Namely, in order to solve the above-described problem, a first invention provides a heat ray shielding laminated glass, with an intermediate layer having a heat ray shielding performance interposed between opposed two plate glasses, wherein an intermediate layer having the heat ray shielding performance is obtained by being cured by irradiation of ultraviolet ray, after a dispersion of composite tungsten oxide particles (A1) and/or hexaboride particles (A2) is dissolved into an ultraviolet ray curing resin precursor (E) and thereafter is filled in a gap between the opposed two plate glasses, the composite tungsten oxide particles (A1) and/or the hexaboride particles (A2) being manufactured by the steps of:

obtaining slurry by dispersing into a hydrocarbon solvent (B), the composite tungsten oxide particles (A1) expressed by a general formula MxWyOz (wherein M is H, He, alkali metal, alkali earth metals, rare earth elements, one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, wherein W is tungsten, O is oxygen, satisfying $0.001 \leq x/y \leq 1$, $2.2 < z/y \leq 3.0$), and/or the hexaboride particles (A2) expressed by a general formula $XB_6$ (wherein element X is at least one kind or more elements selected from a group consisting of La, Ce, Pr, Nd, Gd, Tb, Dy, Ho, Y, Sm, Eu, Er, Tm, Yb, Lu, Sr or Ca);

obtaining a dispersion liquid of the composite tungsten oxide particles (A1) and/or the hexaboride particles (A2), with each surface coated with a polymer compound (C) having an ester group, by adding the polymer compound (C) having the ester group, to the slurry and thereafter pulverizing the polymer compound (C);

obtaining the dispersion of the composite tungsten oxide particles (A1) and/or the hexaboride particles (A2) by adding a deflocculating agent (D) to the dispersion liquid and thereafter the hydrocarbon solvent (B) is evaporated from the dispersion liquid; and pulverizing the dispersion of the composite tungsten oxide particles (A1) and/or the hexaboride particles (A2) in parallel to vaporizing the hydrocarbon solvent (B) or after vaporizing the hydrocarbon solvent (B), wherein the deflocculating agent (D) is an acrylic polymer compound soluble in the hydrocarbon solvent (B) and having compatibility with a ultraviolet ray curing resin precursor (E), and an addition amount of the deflocculating agent (D) is 1.14 to 14 pts.wt. with respect to 1 pts.wt. of the polymer compound (C) having the ester group.

A second invention provides the heat ray shielding laminated glass according to the first invention, wherein a dispersion particle size of the composite tungsten oxide particles (A1) and the hexaboride particles (A2) is 500 nm or less.

A third invention provides the heat ray shielding laminated glass according to the first invention, wherein a solubility parameter of the hydrocarbon solvent (B) is 8.5 to 9.1 $(cal/cm^3)^{1/2}$.

A fourth invention provides the heat ray shielding laminated glass according to the first invention, wherein the polymer compound (C) having the ester group is a graft copolymer having a poly(carbonyl alkylene oxy) chain as a side chain, with at least one kind of hydroxy carboxylic acid selected from ricinoleic acid, 12-hydroxy stearic acid, 12-hydroxydodecanoic acid, 5-hydroxydecanoic acid, and 4-hydroxydodecanoic acid, and 6-hydroxy hexanoic acid, as recurring units, and having an amino group in a molecular structure.

A fifth invention provides the heat ray shielding laminated glass according to the first invention, wherein an addition amount (C) of the polymer compound having the ester group is 0.01 pts.wt. to 5 pts.wt., with respect to 1 pts.wt. of the composite tungsten oxide particles (A1) and/or the hexaboride particles (A2).

A sixth invention provides the heat ray shielding laminated glass according to the first invention, wherein the deflocculating agent (D), being an acrylic polymer compound, is a copolymer of (meth) acrylic acid, 1-13C (meth) acrylic acid alkyl ester, and styrene.

A seventh invention provides the heat ray shielding laminated glass according to the first invention, wherein an addition amount of the deflocculating agent (D) is 0.46 to 50 pts.wt., with respect to 1 pts.wt. of the composite tungsten oxide particles (A1) and/or the hexaboride particles (A2).

An eighth invention provides the heat ray shielding laminated glass according to the first invention, wherein an addition amount of the deflocculating agent (D) is 1.0 to 50 pts.wt., with respect to 1 pts.wt. of the composite tungsten particles (A1) and/or the hexaboride particles (A2).

A ninth invention provides the heat ray shielding laminated glass, being the laminated glass according to the first to eighth inventions, wherein a haze is 5% or less when a visible light transmittance of the laminated glass is set to 50% or more.

A tenth invention provides a manufacturing method of the heat ray shielding laminated glass according to the first to ninth inventions, including the steps of:

dissolving the dispersion of the composite tungsten oxide particles (A1) and/or the hexaboride particles (A2), containing the composite tungsten oxide particles (A1) and/or the hexaboride particles (A2), an ester-based polymer compound (C), and a deflocculating agent (D), into the ultraviolet ray curing resin precursor (E); and thereafter filling the ultraviolet ray curing resin precursor (E) in the gap between opposed two plate glasses, which is then irradiated with ultraviolet ray.

According to the present invention, it is possible to manufacture the laminated glass, in which the ultraviolet ray curing resin with the composite tungsten oxide particles and/or the hexaboride particles dispersed therein, is filled between the glass plates, having the low haze value while having the excellent heat ray shielding function, and having the excellent design property. As a result, the vinyl-based resin between two glass plates can be replaced with the ultraviolet ray curing resin. Then, as a result of the replacement with the ultraviolet ray curing resin, the following technique is achieved. Namely, a kneading operation by using the aforementioned extruding machine, plastograph, kneader, Banbury mixer, and Calendar roll, etc, and a sheet-like molding operation by using the extrusion method, Calendar method, and press method, etc, and an operation at high temperature under high pressure, can be omitted, thus making it possible to improve productivity and reduce a production cost.

BEST MODE FOR CARRYING OUT THE INVENTION

Best mode for carrying out the invention will be described in detail, in an order of 1. each raw material used in a dispersion of composite tungsten oxide particles (A1) and/or hexaboride particles (A2); 2. manufacture of the dispersion of the composite tungsten oxide particles (A1) and/or the hexaboride particles (A2), and 3. manufacture of a laminated glass.

1. Each Raw Material Used in a Dispersion of Composite Tungsten Oxide Particles (A1) and/or Hexaboride Particles (A2)

Regarding each raw material used in the dispersion of the composite tungsten oxide particles (A1) and/or the hexaboride particles (A2) according to the present invention, explanation will be given in an order of (1) <1> composite tungsten oxide particles (A1); <2> hexaboride particles (A2), <3> composite tungsten oxide particles (A1) and hexaboride particles (A2); (2) hydrocarbon solvent (B); (3) a polymer compound (C) having an ester group; (4) a deflocculating agent (D); and (5) ultraviolet ray curing resin precursor (E).

(1) <1> Composite Tungsten Oxide Particles (A1)

The composite tungsten oxide particles (A1) used in the present invention are components that exhibit heat ray shielding effect, which are expressed by a general formula $M_xW_yO_z$ (wherein element M is one kind or more elements selected from H, He, alkali metal, alkali earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, wherein W is tungsten, O is oxygen, satisfying $0.001 \leq x/y \leq 1.1$, $2.2 \leq z/y \leq 3.0$).

The composite tungsten oxide particles (A1) expressed by the general formula $M_xW_yO_z$ have excellent durability in a case of having hexagonal, tetragonal, and cubic crystal structures. Therefore, it is preferable to include one or more crystal structures selected from the hexagonal, tetragonal, and cubic crystals. For example, in a case of the composite tungsten oxide particles (A1) having the hexagonal crystal structure, the composite tungsten oxide particles containing one kind or more elements selected form each element of Cs, Rb, K, Tl, In, Ba, Li, Ca, Sr, Fe, Sn, can be given as preferable element M.

At this time, addition amount x of the element M is preferably 0.001 or more and 1.1 or less in x/y, and further preferably around 0.33. This is because a value of x/y calculated in theory from the hexagonal crystal structure is 0.33, and preferable optical characteristics can be obtained around this addition amount. Meanwhile, oxygen presence Z is preferably 2.2 or more and 3.0 or less in z/y. $Cs_{0.33}WO_3$, $Rb_{0.33}WO_3$, $K_{0.33}WO_3$, $Ba_{0.33}WO_3$ can be given as a typical example satisfying this addition amount. However, useful near infrared ray absorption characteristics can be obtained, if x, y, z, fall within the aforementioned range.

<2> Hexaboride Particles (A2)

The hexaboride particles (A2) according to the present invention are expressed by a general formula $XB_6$. Here, element X is preferably one kind or more elements selected from La, Ce, Pr, Nd, Gd, Tb, Dy, Ho, Y, Sm, Eu, Er, Tm, Yb, Lu, Sr, and Ca. Specifically, hexaboride lanthanum [$LaB_6$], hexaboride cerium [$CeB_6$], hexaboride praseodymium [$PrB_6$], hexaboride neodymium [$Nd\ B_6$], hexaboride gadolinium [$Gd\ B_6$], hexaboride terbium [$Tb\ B_6$], hexaboride dysprosium [$Dy\ B_6$], hexaboride holmium [$Ho\ B_6$], hexaboride yttrium [$Y\ B_6$], hexaboride samarium [$Sm\ B_6$], hexaboride europium [$Eu\ B_6$], hexaboride erbium [$Er\ B_6$], hexaboride thulium [$Tm\ B_6$], hexaboride ytterbium [$Yb\ B_6$], hexaboride lutetium [$Lu\ B_6$], hexaboride lanthanum cerium [$(La, Ce)B_6$], hexaboride strontium [$Sr\ B_6$], hexaboride calcium [$Ca\ B_6$], can be given as typical examples of the hexaboride particles (A2).

As the hexaboride particles (A2), the surface thereof is preferably not oxidized. However, normally the surface is slightly oxidized in many cases, and a certain degree of oxidation of the surface is inevitable in a dispersion step of the particles. However, in this case also, effectiveness of exhibiting the heat ray shielding effect is the same, and accordingly the hexaboride particles with the surface thereof oxidized can be used.

Further, regarding the hexaboride particles, larger heat ray shielding effect can be obtained, as completeness as crystal is higher. However, even in a case of the hexaboride particles having low crystallinity in which a broad diffraction peak is generated by X-ray diffraction, it can be applied to the preset invention, because the heat ray shielding effect is exhibited if a basic bond in the particles is composed of a bond of each metal and boron.

Although the hexaboride particles (A2) are colored powders of grayish-black, brownish-black, and green-black, the infrared ray shielding capability can be sufficiently maintained if each particle size is set to be sufficiently smaller, compared with a visible light wavelength and the powders are set in a state of being dispersed in an acrylic resin molding material, despite the visible light transmission performance is generated in the obtained heat ray shielding transparent resin molding. Although the reason therefore is not clarified in detail, it can be considered that a quantity of free electrons in the particles is increased, and an absorption energy of an indirect transition between bands by free electrons inside of the particles and on the surface is present in the vicinity of a near infrared region from just a visible light region, and therefore the heat ray in this wavelength region is selectively reflected and absorbed.

<3> Composite Tungsten Oxide Particles (A1) and Hexaboride Particles (A2)

Actually, in the film sufficiently finely and uniformly dispersing the composite tungsten oxide particles (A1) and/or the hexaboride particles (A2), the transmittance has a maximum value between wavelengths 400 nm and 700 nm, and has a minimum value between wavelengths 700 nm and 1800 nm. When it is taken into consideration that the wavelength of the visible light is in a range of 380 nm to 780 nm, and a visibility is in an appearance of a bell-like shape having a peak in the vicinity of 550 nm, this film has characteristics of effectively transmitting the visible light and effectively reflecting and absorbing the heat ray other than the visible light. Further, a mixing ratio of the composite tungsten oxide particles (A1) and the hexaboride particles (A2) can be arbitrarily set. Namely, even if the composite tungsten oxide particles (A1) or the hexaboride particles (A2) are used alone, or the composite tungsten oxide particles (A1) and the hexaboride particles (A2) are used in a mixed state, the aforementioned optical characteristics and design property can be maintained.

A dispersion particle size of the composite tungsten oxide particles (A1) and the hexaboride particles (A2) is preferably 500 nm or less.

This is because when the dispersion particle size of the composite tungsten oxide particles (A1) and the hexaboride particles (A2) is set to be 500 nm or less, the light is not shielded by scattering, then the visibility of a visible light region is maintained, and simultaneously transparency can be efficiently maintained.

Particularly, when the transparency of the visible light region is emphasized, it is further preferable to consider the scattering by particles. When the scattering by particles is emphasized, the dispersion particle size of the composite tungsten oxide particles (A1) and the hexaboride particles (A2) is 200 nm or less, or preferably 100 nm or less. This is because when the dispersion particle size of dispersed particles is small, it is possible to reduce scattering of the light by geometrical scattering or Mie scattering in the visible light region of wavelengths 400 nm to 780 nm. This is because as a result of reducing the scattering of the light, it is possible to prevent a state in which the heat ray shielding film takes an appearance of a frosted glass, and a sharp transparency can not be obtained. This is because when the dispersion particle size of the dispersed particles is 200 nm or less, the geometrical scattering or Mie scattering is reduced, and the visible light region becomes a Rayleigh scattering region. In this Rayleigh scattering region, scattered light is reduced inversely proportionally to sextuplicate of the particle size, and therefore scattering is reduced as the dispersion particle size is decreased, thus improving the transparency. Further, when the dispersion particle size is 100 nm or less, scattered light is preferably extremely lessened. From the viewpoint of avoiding the scattering of the light, the dispersion particle size is preferably set to be small, and when the dispersion particle size is set to be 1 nm or more, industrial manufacture is facilitated.

Further, when the surfaces of the composite tungsten oxide particles (A1) and the hexaboride particles (A2) are coated with oxide containing one kind or more elements of any one of Si, Ti, Zr, Al, weatherability can be preferably further improved.

(2) Hydrocarbon Solvent (B)

First, a solubility parameter of a solvent will be explained.

In the Regular Solution Model, a force that acts between solvent-solute is modeled only as an intermolecular force, and therefore it can be considered that only intermolecular force acts as an interaction for flocculating liquid molecules. A flocculating energy of liquid is equivalent to evaporation enthalpy, and therefore the solubility parameter is defined for each solvent, by mol evaporation enthalpy $\Delta Hv$ and mol volume Vm. Namely, the solubility parameter is calculated from a square root $(cal/cm^3)^{1/2}$ of an evaporated heat necessary for evaporating the solvent of 1 mol volume.

An actual solvent is rarely a regular solution, and the force other than the intermolecular force such as hydrogen bonding acts between molecules of solvent-solute, and whether two components are mixed or phase-separated is determined thermodynamically by a difference between mixed enthalpies and mixed entorpies of these components. However, empirically, substances having close solubility parameters are more likely to be easily mixed with each other. Therefore, a solubility parameter value serves as a reference for judging easy mixture of the solute and the solvent.

Here, solubility parameter $\delta_s$ of the solvent is shown by formula (1), and solubility parameter $\delta_p$ of a polymer is shown by formula (2).

$$\delta_s = (\Delta Hv - RT/Vm)^{1/2} \, (cal/cm^3)^{1/2} \qquad \text{Formula (1)}$$

$$\delta_p = \rho \epsilon G/M \, (cal/cm^3)^{1/2} \qquad \text{Formula (2)}$$

(wherein $\Delta Hv$: mol evaporation enthalpy, Vm: mol volume of the solvent, G: flocculating energy constant of atom and atom group obtained by a method of small, M: structural molecular weight of the polymer, $\Sigma$: density, R: vapor constant, T: temperature.)

It is empirically known and widely used that compatibilities of heterogeneous solvents, solvent and polymers, and heterogeneous polymers are satisfactory, if the difference of the solubility parameter value $\delta$ is small, which is obtained by the formula (1) and the formula (2), and meanwhile when the difference of the value $\delta$ is large, the compatibilities are unsatisfactory.

(see Solvent pocket handbook of new version (edited by the Society of Synthetic Organic Chemistry, Japan, published by Ohmsha), Practical polymer material found by characteristics (written by Fumio Ide, published by Japanese Industrial Committee))

Next, the hydrocarbon solvent (B) used in the present invention will be explained.

The solubility parameter of the hydrocarbon solvent (B) used in the present invention is 8.5 to 9.1 $(cal/cm^3)^{1/2}$. If the solubility parameter falls within the aforementioned range, it is possible to secure solubility of a polymer compound (C) having an ester group used in the present invention, into the hydrocarbon solvent (B), and in the step of manufacturing the dispersion liquid of the composite tungsten particles (A1) and/or the hexaboride particles (A2) coated with the polymer compound (C) having the ester group, it becomes easy to pulverize the composite tungsten particles (A1) and/or the hexaboride particles (A2) to a desired particle size and this is preferable. Toluene and xylene, etc, can be given as the preferable hydrocarbon solvent (B).

(3) Polymer Compound (C) Having the Ester Group.

It is important to coat the surfaces of the composite tungsten oxide particles (A1) and/or the hexaboride particles (A2), with the polymer compound (C) having the ester group.

The polymer compound (C) having the ester group used in the present invention is a graft copolymer having poly (carbonyl alkylene oxy) chain as a side chain, and having an amino group in the formula. As the polymer compound (C) having the ester group as described above, product name: Solsperse24000GR (by (by Lubrizol Corporation), and product name: Slsperse32000 (by (by Lubrizol Corporation), etc, can be given as examples.

The addition amount of the polymer compound (C) having the ester group is preferably 0.01 to pts.wt., with respect to 1 pts.wt. of the composite tungsten oxide particles (A1) and/or the hexaboride particles (A2), and more preferably, is 0.1 to 3 pts.wt. If the addition amount of the polymer compound (C) having the ester group is 0.01 pts.wt. or more, the composite tungsten oxide particles (A1) and/or the hexaboride particles (A2) can be preferably uniformly dispersed. Further, if the addition amount of the polymer compound (C) having the ester group is 5 pts.wt. or less, the composite tungsten oxide particles (A1) and/or the hexaboride particles (A2) are set in a power state by vaporizing the hydrocarbon solvent (B) after adding and mixing the deflocculating agent (D) into the dispersion liquid, and this is preferable.

Here, a manufacturing method of the graft copolymer having poly (carbonyl alkylene oxy) chain as the side chain, and having the amino group in the formula, will be explained simply.

First, poly (carbonyl alkylene oxide) is synthesized, with ricinoleic acid, at least one kind of hydroxyl carboxylic acid selected from 12-hydroxystearic acid, 12-hydroxydecanoic acid, 5-hydroxydecanoic acid, and 4-hydroxydecanoic acid, and 6 hydroxyhexanoic acid, as recurring units.

Next, polyethylenimine is added to this poly (carbonyl alkylene oxide), and by utilizing a dehydration reaction between the amino group of the polyethylenimine and a carboxyl group of the polyethylenimine, it is possible to obtain the graft copolymer having poly (carbonyl alkylene oxy) chain as the side chain, and having the amino group in the formula, being an example of the polymer compound (C) having the ester group used in the present invention.

(4) Deflocculating Agent (D)

The deflocculating agent (D) used in the present invention will be explained.

The deflocculating agent (D) used in the present invention has solubility into the hydrocarbon solvent (B), which is an acrylic polymer compound having compatibility with a monomer mainly composed of methyl methacrylate.

The deflocculating agent (D) has solubility into the hydrocarbon solvent (B), and therefore in this dispersion, the composite tungsten oxide particles (A1) and/or the hexaboride particles (A2) are hardly flocculated, thus improving dispersability. Further, the deflocculating agent (D) has compatibility with the monomer mainly composed of methyl methacrylate, and therefore the haze (cloudness) of the molding body using the resin composition can be suppressed, thus increasing the design property.

As the deflocculating agent (D), specifically, an acrylic polymer compound such as (meth) acrylic acid and 1-13C (meth) acrylic acid alkyl ester and styrene can be given. As such an acrylic polymer compound, product name JONCRYL611 (by BASF Corporation), product name DIANAL BR (by MITSUBISHI RAYON CO., LTD.), or the like, can be given as examples.

(5) Ultraviolet Ray Curing Resin Precursor (E)

The ultraviolet ray curing resin precursor (E) used in the present invention will be explained.

The ultraviolet ray curing resin precursor (E) contains typically raw materials shown below as constituent elements, and is cured by being irradiated with ultraviolet rays. As the constituent elements, <1> monofunctional monomer, <2> multi-functional monomer, <3> photopolymerization initiator, <4> poly epoxy polyacrylate, <5> polyurethane acrylate, <6> a silane compound, will be explained sequentially hereinafter.

<1> Monofunctional Monomer

As examples of the monofunctional (meth)acrylate, being a monofunctional monomer, (meth)acrylic acid, methyl (meth)acrylate, ethyl(meth)acrylate, propyl(meth)acrylate, n-butyl(meth)acrylate, t-butyl(meth)acrylate, isobutyl(meth) acrylate, 2-ethylhexyl(meth)acrylate, nonyl(meth)acrylate, tridecyl(meth)acrylate, hexadecyl(meth)acrylate, octadecyl (meth)acrylate, isoamyl(meth)acrylate, 2-hydroxyethyl (meth)acrylate, 3-chloro-2-hydroxypropyl(meth)acrylate, methoxyethyl(meth)acrylate, butoxyethyl(meth)acrylate, benzyl(meth)acrylate, nonylphenoxyethyl(meth)acrylate, tetrahydrofurfuryl(meth)acrylate, glycidyl(meth)acrylate, 2-hydroxy-3-phenoxypropyl(meth)acrylate, nonylphenoxyethyltetrahydrofurfuryl(meth)acrylate, caprolactone modified tetrahydrofurfuryl(meth)acrylate, acryloyl morpholine, phenoxyethyl(meth)acrylate, β-carbonylethylacrylate, isobornyl(meth)acrylate, norbornyl(meth)acrylate, 2-(meth) acryloyloxymethyl-2-methylbicycloheptaneadamanty 1(meth)acrylate, dicyclopentenyl(meth)acrylate, dicyclopenyanyl(meth)acrylate, dicyclopentenyloxyethyl(meth) acrylate, tetracyclodecanyl(meth)acrylate, cyclohexyl(meth) acrylate, 2-(2-ethoxyethoxy)ethylacrylate, 1,6-hexanedioldiacrylate, pentaerytrotyltriacrylate(PETIA), trimethylolpropanetriacrylate(TMPTA), etc, can be given.

<2> Multi-Functional Monomer

As examples of two-functional (meth)acrylate, being the multi-functional monomer, 1,4-butanedioldi(meth)acrylate, 1,6-hexandioldi(meth)acrylate, neopentylglycoldi(meth) acrylate, 2-methyl-1,8-octanedioldi(meth)acrylate, 2-butyl-2-ethyl-1,3-propanedioldi(meth)acrylate, ethylene glycoldi (meth)acrylate, polypropyleneglycoldi(meth)acrylate, di(meth)acrylate obtained by adding 4 mol or more of ethylene oxide or propylene oxide to 1 mol neopentylglycol, ethylene oxide modified phosphoric acid (meth)acrylate, ethylene oxide modified alkyl phosphoric acid(meth)acrylate, diethylene glycoldi(meth)acrylate, dipropylene glycoldi (meth)acrylate, tripropylene glycoldi(meth)acrylate, polyether(meth)acrylate, eidthyl aminoethyl(meth)acrylate, N-vinylpyrrolidone, N-vinylcaprolactam, vinylethermonomer, etc, can be given. Further, as alicyclic two-functional (meth)acrylate, di(meth)acrylate obtained by adding 2 mol ethylene oxide or propylene oxide to norbornanedimethanol, tricyclodecanedimethanoldi(meth)acrylate, tricyclodecanediethanoldi(meth)acrylate, di(meth)acrylate obtained by adding 2 mol ethylene oxide or propylene oxide to tricyclodecanedimethanol, pentacyclopentadecanedimethanoldi (meth)acrylate, pentacyclopentadecanediethanoldi(meth) acrylate, di(meth)acrylate obtained by adding 2 mol ethylene oxide or propylene oxide to pentacyclopentadecanedimethanol, di(meth)acrylate of diol obtained by adding 2 mol ethylene oxide or propylene oxide to pentacyclopentadecanediehtanol, and dimethyloldicyclopentanedi(meth)acrylate, etc, can also be used.

<3> Photopolymerization Initiator

As the photopolymerization initiator, there is absolutely no problem, provided that it is used in this field. For example, molecular fragmentation types such as benzoinisobutylether, 2,4-diethyloxanthone, 2-isobutylether, 2,4-diethylthioxanthone, 2-isopropylthioxanthone, benzyl, 1-hydroxycyclohexylphenylketone, benzomethylether, benzildimethylketal, 2-hydroxy-2-methyl-1-phenylpropane-1-one, 1-(4-isopropylphenyl)-2-hydroxy-2-methylpropane-1-one and 2-methyl-1-(4-methyl thiophenyl)-2-morpholinopropane-1-one, and a hydrogen abstracting type such as benzophenone, 4-phenylbenzophenone, isophthalphenone, 4-benzoyl-4'-methyl-diphenyl sulfide, can be used.

<4> Polyepoxyacrylate

As polyepoxyacrylate, for example, bisphenol A-type epoxy resin, bisphenol F-type epoxy resin, phenol.novolactype epoxy resin, terminal glycidylether, being bisphenol A-type propyleneoxide adduct, a reactant of epoxy resin such as fluorine epoxy resin and (meth)acrylic acid, etc, oligomers such as polyesterpoly(meth)acrylate, (meth)acrylate monomers such as 2-hydroxyethyl(meth)acryolate, 2-hydroxypropyl(meth)acrylate, phenoxyethyl(meth)acrylate, phenyloxypolyetoxy(meth)acrylate, 2-hydroxy-3-phenyloxypropyl (meth)acrylate, isobornyl(meth)acrylate, dicyclopentanyl (meth)acrylate, ethyleneglycoldi(meth)acrylate, polyethyleneglycoldi(meth)acrylate, 1,6-hexandioldi(meth) acrylate, 1,9-nonanedioldi(meth)acrylate, trimethyrolpropanetri(meth)acrylate, bisphenolApolyetoxydi(meth)acrylate, bisphenolApolypropoxydi(meth)acrylate, bisphenolFpolyethoxydi(meth)acrylate, o-phenylphenyloxyethyl(meth)acrylate, o-phenylphenyloxypolyetoxy (meth)acrylate, tribromophenyloxyethyl(meth)acrylate, can be given.

<5> Polyurethane Acrylate

As polyurethane acrylate, for example, polyols such as ethyleneglycol, 1,4-butanediol, neopentylglycol, 2-ethyl-2-butyl-1,3-propanediol, polycaprolactonepolyol, polyethyleneglycol, polytetramethyleneglycol, polyesterpolyol, polycaprolactonepolyol, polyethylenglycol, polytetramethyleneglycol, polyester polyol, polycarbonatediol, an organic polyisocyanates such as tolylene diisocyanate, isophorone diisocyanate, hexamethylene diisocyanate, trimethylhexamethylene diisocyanate, ε-caprolactone adduct of 2-hydroxyethyl(meth)acrylate, 2-hydroxypropyl(meth) acrylate, 4-hidoxybutyl(meth)acrylate, 2-hydroxyethyl (meth)acrylate, an ethylenic unsaturated compound containing a hydroxyl group such as pentaerythritoltri(meth) acrylate, and a reactant of the polyisocyanates and the ethylenic unsaturated compounds containing a hydroxyl group, can be given.

<6> A Silane Compound

As the silane compound, for example, γ-aminopropylmethoxysilane, γ-aminopropylethoxysilane, N-β(aminoethyl)-γ-aminopropyltrimethoxysilane, N-β(aminoethyl)-γ-aminopropylmethyldimethoxysilane, N-phenyl-γ-aminopropyltrimethoxysilane, γ-anilinopropyltrimethoxysilane, γ-dibutylaminopropyltrimethoxysilane, γ-ureidopropyltriethoxysilane, N-β(N-vinylbenzilaminoethyl)-γ-aminopropyltrimethoxysilane-.hydrochloride, γ-methacryloxypropyltrimethoxysilane, γ-methacryloxypropyltriethoxysilane, vinyltrimethoxysilane, vinyltriethoxysilane, vinyltrichlorosilane, vinyltris(β-methoxyethoxy)silane, γ-glycidoxypropylmethyldiethoxysilane, γ-glycidoxypropyltriethoxysilane, γ-(3,4-epoxycyclohexyl)ethyltrimethoxysilane, γ-glycidoxypropyltrimethoxysilane, γ-mercaptopropyltrimethoxysilane, γ-chloropropyltrimethoxysilane, trimethylchlorosilane, hexamethyldisilazane, N-trimethylsilylimidazole, bis(trimethylsilyl)urea, trimethylsilylacetamide, bistrimethylsilylacetamide, trimethylsilylisocianate, trimethylmethoxysilane, trimethylethoxysilane, methyltrimethoxysilane, methyltriethoxysilane, dimethyldimethoxysilane, dimethyldiethoxysilane, t-butyldimethylchlorosilane, t-butyldiphenylchlorosilane, triisopropylchlorosilane, n-propyltrimethoxysilane, isobutyltrimethoxysilane, n-hexyltrimethoxysilane, n-decyltrimethoxysilane, n-hexadecyltrimethoxysialne, 1,6-bis(trimethoxysilyl)hexan, dimethylsilyldiisocianate, methylsilyltriisocyanate, phenyltrimethoxysilane, diphenyldimethoxysilane, and phenylsilyltriisocianate, etc, can be given.

2. Manufacture of the Composite Tungsten Oxide and/or Hexaboride Particles Dispersion Regarding the manufacture of a dispersion of the composite tungsten oxide particles (A1) and/or the hexaboride particles (A2), explanation will be given for (1) the manufacturing step of a dispersion liquid of the composite tungsten oxide particles (A1) and/or the hexaboride particles (A2) coated with a polymer compound (C) having the ester group; (2) the manufacturing step of the dispersion of the composite tungsten oxide particles (A1) and the hexaboride particles (A2); and (3) an operational point in the manufacturing step of the dispersion of the composite tungsten oxide particles (A1) and/or the hexaboride particles (A2), in this order.

(1) The Manufacturing Step of a Dispersion Liquid of the Composite Tungsten Oxide Particles (A1) and/or the Hexaboride Particles (A2) Coated with a Polymer Compound (C) Having the Ester Group In order to manufacture the dispersion of the composite tungsten oxide particles (A1) and/or the hexaboride particles (A2) according to the present invention, first, the polymer compound (C) having the ester group is added to slurry in which the composite tungsten oxide particles (A1) and/or the hexaboride particles (A2), and the hydrocarbon solvent (B) are mixed, and which is then for example pulverized by a medium stirring mill, thus preparing the dispersion liquid of the composite tungsten oxide particles (A1) and/or the hexaboride particles (A2) coated with the polymer compound (C) having the ester group.

Note that as a method for pulverizing the dispersion liquid, a wet-type pulverization method is preferable, which uses the medium stirring mils such as an ultrasonic homogenizer and a ball mill (beads mill).

Next, the deflocculating agent (D) is added to the dispersion liquid of the composite tungsten oxide particles (A1) and/or the hexaboride particles (A2) coated with the polymer compound (C) having the ester group, and thereafter, in parallel to the step of vaporizing the hydrocarbon solvent (B) or after vaporizing the hydrocarbon solvent (B), the dispersion liquid is pulverized to be in a powder state, by using a generally used pulverizing/disintegration machine such as an automated mortar.

(2) The Manufacturing Step of the Dispersion of the Composite Tungsten Oxide Particles (A1) and/or the Hexaboride Particles (A2)

The deflocculating agent (D) having compatibility with the monomer soluble into the hydrocarbon solvent (B) and mainly composed of the methyl methacrylate, is added and mixed into the dispersion liquid of the composite tungsten oxide particles (A1) and/or the hexaboride particles (A2)

coated with the polymer compound (C) having the ester group, to thereby obtain a mixture solution. Then, the hydrocarbon solvent (B) is vaporized from the mixture solution thus obtained. At this time, in parallel to vaporizing the hydrocarbon solvent (B) from the obtained mixture solution or after vaporizing the hydrocarbon solvent (B), a residual material is pulverized, to thereby manufacture the dispersion of the composite tungsten oxide particles (A2) and/or the hexaboride particles (A2).

(3) An Operational Point in the Manufacturing Step of the Dispersion of the Composite Tungsten Oxide Particles (A1) and/or the Hexaboride Particles (A2)

In the aforementioned steps of (5), (6), the mixing ratio of the polymer compound (C) having the ester group, and the deflocculating agent (D) is optimized in advance.

Specifically, the addition amount of the polymer compound (C) having the ester group is preferably set to be 0.01 to 5 pts.wt., with respect to 1 pts.wt. of the composite tungsten oxide particles (A1) and/or the hexabofide particles (A2). More preferably, the addition amount is 0.1 to 3 pts.wt. with respect to 1 pts.wt. of the composite tungsten oxide particles (A1) and the hexaboride particles (A2).

By setting the addition amount of the polymer compound (C) having the ester group to be 0.01 pts.wt. or more, with respect to 1 pts.wt. of the composite tungsten oxide particles (A1) and/or the hexaboride particles (A2), the composite tungsten oxide particles (A1) and/or the hexaboride particles (A2) can be uniformly dispersed. By setting the addition amount of the polymer compound (C) having the ester group to be 5 pts.wt. or less, the residual material is set in a powder state when the hydrocarbon solvent (B) is vaporized after adding and mixing the deflocculating agent (D) into the dispersion liquid, and this is preferable.

Meanwhile, the addition amount of the deflocculating agent (D) is preferably set to be 0.46 to 50 pts.wt., with respect to 1 pts.wt. of the composite tungsten oxide particles (A1) and/or the hexaboride particles (A2), and is more preferably set to be 1.0 to 50 pts.wt. and further preferably set to be 2 to 20 pts.wt. When the addition amount of the deflocculating agent (D) is 0.46 pts.wt. or more, the aggregates of the composite tungsten oxide particles (A1) and/or the hexaboride particles (A2) are hardly formed in the dispersion liquid, thus preferably realizing sufficient dispersability. It is more effective if the addition amount of the deflocculating agent (D) is 1.0 pts.wt. or more. Further, when the addition amount of the deflocculating agent (D) is 50 pts.wt. or less, this is preferable because a mechanical strength of the molding is not decreased, which is obtained by using the dispersion of the composite tungsten oxide particles (A1) and/or the hexaboride particles (A2), and weatherability is not deteriorated even when used outdoors.

The dispersion of the tungsten oxide particles (A1) and/or the hexaboride particles (A2) manufactured by optimizing the mixing ratio of the added polymer compound (C) having the ester group and deflocculating agent (D) in the aforementioned range, is dissolved into the monomer (E) mainly composed of methyl methacrylate. Then, when the monomer (E) is polymerized in a casting mold to form a molding under existence of a radical polymerization initiator, the aggregates of the composite tungsten oxide particles (A1) and/or the hexaboride particles (A2) are not allowed to be generated in the molding.

Specifically, the deflocculating agent (D) is added and mixed at a prescribed ratio, into the hydrocarbon solvent (B) dispersion liquid containing the composite tungsten oxide particles (A1) and/or the hexaboride particles (A2) coated with the polymer compound (C) having the ester group, and thereafter the hydrocarbon solvent (B) is evaporated from the obtained mixture solution.

Each kind of operation of distillation and vaporization can be applied to this method. Namely, this method includes a method of heating the hydrocarbon solvent dispersion at a temperature of a boiling point or more under normal pressure or reduced pressure to cause distillation of the hydrocarbon solvent (B), and a method of causing the distillation of the hydrocarbon solvent (B) by introducing inactive gases such as nitrogen, carbon dioxide, argon, and helium. Note that industrially, the method of causing distillation of the hydrocarbon solvent (B) by heating the solution under normal pressure at 80 to 200° C., preferably at 120 to 180° C., is suitable.

Although not particularly limited, distillation time of the dispersion liquid containing the composite tungsten oxide particles (A1) and/or the hexaboride particles (A2) coated with the polymer compound (C) having the ester group, is normally preferably set to be 1 to 5 hours. Industrially, the temperature is increased up to this range, and thereafter is maintained for 0.5 to 10 hours and preferably for 1 to 5 hours, and the reaction is completed. By completion of the reaction, it is possible to efficiently obtain large quantities of homogeneous and powdery dispersion of the composite tungsten oxide particles (A1) and/or the hexaboride particles (A2).

Here, in the distillation of the dispersion liquid containing the composite tungsten oxide particles (A1) and/or the hexaboride particles (A2) coated with the polymer compound (C) having the ester group, in parallel to vaporizing the hydrocarbon solvent (B), the residual material is pulverized, to thereby obtain the dispersion of the powdery composite tungsten oxide particles (A1) and/or the hexaboride particles (A2). Meanwhile, by pulverizing the residual material after vaporizing the hydrocarbon solvent (B), the dispersion of the powdery composite tungsten oxide particles (A1) and/or the hexaboride particles (A2) can also be obtained.

The surfaces of the obtained composite tungsten oxide particles (A1) and/or hexaboride particles (A2) are coated with the polymer compound (C) having the polyester group. Meanwhile, the deflocculating agent (D) is an acrylic polymer compound having compatibility with the monomer soluble into toluene and mainly composed of methylmethacrylate.

3. Manufacture of Laminated Glass

The manufacturing method of the laminated glass according to the present invention includes the steps of:

dissolving the obtained powdery dispersion containing the composite tungsten oxide particles (A1) and/or the hexaboride particles (A2), the polymer compound (C) having the ester group, and the deflocculating agent (D), into the ultraviolet ray curing resin precursor (E); and thereafter filling the ultraviolet ray curing resin precursor (E) between opposed two plate glasses; and irradiating it with ultraviolet ray.

Specifically, polymerization of monomer is performed by mixing at least one kind selected from a single-functional monomer <1> and multi-functional monomer <2>, at least one kind selected from the photopolymerization initiator <3>, at least one kind selected from polyurethane acrylate <4>, polyisocianate <5>, and silane coupling agent <6> as needed, then filling the obtained ultraviolet ray curing resin precursor (E) in a desired sized cell, and irradiating it with ultraviolet ray. Further, in order to improve the durability and strength of the molding, phosphoric ester-based and phenol-based antioxidizing agents, a coupling agent, a surfactant agent, an antistatic agent, and a flame retardant agent, etc, may be added and mixed into the aforementioned added mixture as needed.

As described above, in the laminated glass of the present invention, the dispersability is improved, without flocculating the composite tungsten oxide particles (A1) and/or the hexaboride particles (A2) in the intermediate layer including ultraviolet ray curing resin, and which is the laminated glass prepared by the present invention for the first time.

Therefore, the aforementioned laminated glass is excellent, having a low haze value, and also having the excellent heat ray shielding capability. As specific optical characteristics of the laminated glass of the present invention, haze is desirably 5% or less when the visible light transmittance is 50% or more. The laminated glass of the present invention can provide the heat ray shielding capability and design property for the laminated glass widely applied to window materials of buildings, and window materials of automobiles, trains, and airplanes. Therefore, the laminated glass of the present invention can be utilized in a wider field.

Here, explanation will be given for the characteristics of the composite tungsten oxide particles (A1) and the hexaboride particles (A2), in a case of a single use and a mixed use.

The composite tungsten oxide particles (A1) have a characteristic of easy manufacture and excellent productivity, in a case of the single use. The hexaboride particles (A2) have a characteristic of having excellent weatherability in the case of the single use. In the case of the mixed use of both of them, they have a characteristic of having excellent design property, because they are in a complementary color relation.

Further, by substituting the vinyl resin between the two plate glasses that constitute the laminated glass, with the ultraviolet ray curing resin, it is possible to omit a kneading operation using an extruder, a plastograph, a kneader, a banbury mixer, and a calender roller, etc, and a molding operation in a sheet-like shape by an extrusion method, a calender method, and a press method, etc, and an operation at high temperature and under high pressure using an autoclave, thus making it possible to improve productivity and reduce a production cost.

Note that as an evaluation method of a total light transmittance and haze, for example a commercially available haze meter is used, and regarding the total light transmittance (Tt) (unit: %), a method based on JIS K 7361 can be used, and regarding the haze (H) (unit: %), a method based on JIS K 7136 can be used.

EXAMPLES

Examples of the present invention will be described hereinafter, with reference to the drawings. However, the present invention is not limited at all, by the following examples.

Regarding the evaluation of the optical characteristics of the molding obtained in this example, haze (H) (unit: %) was measured based on JIS K 7136, by using the haze meter (by MURAKAMI COLOR RESEARCH LABORATORY). Also, a visible light transmittance (unit: %) and a solar light transmittance ST (unit: %) were measured by using a spectrophotometer U-4000 (by HITACHI Ltd.).

Example 1

Composite tungsten oxide $Cs_{0.33}WO_3$ (by SUMITOMO METAL MINING CO., LTD) 170 g having a particle size of 1 to 3 μm as the composite tungsten oxide particles (A1), and toluene 1762 g as the hydrocarbon solvent (B), were stirred to obtain a mixture. S2400GR (by Lubrizol Corporation) 68 g was added to this mixture as the polymer compound (C), to prepare slurry. The obtained slurry was charged into a medium stirring mill together with beads, so that the slurry was circulated, pulverized, and dispersed, to thereby obtain the dispersion liquid of the composite tungsten oxide particles coated with the polymer compound (C) having the ester group (abbreviated as a liquid hereinafter). The dispersion particle size of the composite tungsten oxide particles coated with the polymer compound (C) having the ester group was 90 nm.

As an acrylic polymer compound-based deflocculating agent (D) having compatibility with the ultraviolet ray curing resin precursor, JONCRYL611 (by BASF Corporation) was dissolved into toluene, being the hydrocarbon solvent (B), to thereby prepare 40 wt. % solution (abbreviated as β liquid.).

The aforementioned a liquid 10 g and β liquid 6.5 g were mixed. Then, toluene was evaporated from the obtained mixture solution, to thereby obtain the dispersion in which particles of the composite tungsten oxide coated with the polymer compound having the ester group were uniformly dispersed. This dispersion contains 6.5 pts.wt. of the deflocculating agent (D), with respect to 1 pts.wt. of the polymer compound (C) having the ester group. Further, the dispersion of the composite tungsten oxide particles (A1) and/or the hexaboride particles (A2) was pulverized by the automated mortar to be set in a powdery state.

Further, the aforementioned dispersion was added and dissolved into the ultraviolet ray curing resin precursor Uvekol A (by UCB Corporation), so that the content of the composite tungsten oxide particles was 0.08 pts.wt, to prepare an intermediate layer solution (abbreviated as γ liquid hereinafter).

The γ liquid was filled between two soda lime glass plates (50 mm×50 mm) having 3 mm thickness, with 2 mm of space interposed therebetween, which was then polymerized by irradiation of light from a mercury lamp set at 400 W for 20 minutes from a distance of 30 cm, to thereby obtain the laminated glass.

Note that the content of the composite tungsten oxide particles (A1) in a dissolved material was set to be 0.08 wt. %, to obtain 70% visible light transmittance of the obtained laminated glass. The content of the composite tungsten oxide particles (A1) in the obtained laminated glass was 0.08 wt. %.

As the optical characteristics of the obtained laminated glass, haze (H), visible light transmittance T (unit: %), and solar light transmittance ST (unit: %) were evaluated. The evaluation result is shown in table 1.

Example 2

α liquid 10 g and β liquid 14 g explained in the example 1 were mixed, and the same operation as the operation of the example 1 was performed, to thereby obtain the dispersion. In this dispersion, 14 pts.wt. of the deflocculating agent (D) was contained, with respect to 1 pts.wt. of the polymer compound (C) having the ester group.

The optical characteristics of the laminated glass were evaluated in the same way as the example 1. The evaluation result is shown in table 1.

Example 3

α liquid 10 g and β liquid 1.14 g explained in the example 1 were mixed, and the same operation as the operation of the example 1 was performed, to thereby obtain the dispersion. 1.14 pts.wt. of JONCRYL611 (by BASF Corporation) with respect to 1 pts.wt. of the polymer compound (C) having the ester group was contained in this dispersion, as the acrylic polymer compound-based deflocculating agent (D).

The same operation as the operation of the example 1 was performed to the dispersion, to thereby obtain the laminated glass of 60×50×2 mm.

The optical characteristics of the laminated glass were evaluated in the same way as the example 1. The evaluation result is shown in table 1.

Example 4

The laminated glass was obtained by performing the same operation as the operation of the example 1, other than a point that S32000 (by Lubrizol Corporation) was used as the polymer compound (C) having the ester group.

The optical characteristics of the laminated glass were evaluated in the same way as the example 1. The evaluation result is shown in table 1.

Example 5

The laminated glass was obtained by performing the same operation as the operation of the example 1, other than a point that BR-116 (by MITSUBISHI RAYON CO., LTD) was used as the deflocculating agent (D).

The optical characteristics of the laminated glass were evaluated in the same way as the example 1. The evaluation result is shown in table 1.

Example 6

Composite tungsten oxide particles dispersion liquid (abbreviated as a' liquid hereinafter) was obtained by the same method as the method of the example 1, other than a point that the addition amount of the polymer compound (C) having the ester group was changed to 680 g.

The $\alpha'$ liquid 10 g and the $\beta$ liquid 125 g explained in the example 1 were mixed, and the same operation as the operation of the example 1 was performed, to thereby obtain the dispersion. In the dispersion, 4 pts.wt. of the polymer compound (C) having the ester group and 50 pts.wt. of the acrylic resin deflocculating agent (D) were contained in the dispersion, with respect 1 pts.wt. of the composite tungsten oxide particles (A).

The same operation as the operation of the example 1 was performed to the dispersion, to thereby obtain the laminated glass.

The optical characteristics of the laminated glass were evaluated in the same way as the example 1. The evaluation result is shown in table 1.

Example 7

The $\alpha'$ liquid 10 g and the $\beta$ liquid 137.5 g explained in the example 6 were mixed, and the same operation as the operation of the example 1 was performed, to thereby obtain the dispersion. 4 pts.wt. of the polymer compound (C) having the ester group and 55 pts.wt. of the acrylic resin deflocculating agent (D) were contained in the dispersion, with respect to 1 pts.wt. of the composite tungsten oxide particles (A).

The same operation as the operation of the example 1 was performed to the dispersion, to thereby obtain the laminated glass.

The optical characteristics of the laminated glass were evaluated in the same way as the example 1. The evaluation result is shown in table 1.

Example 8

The composite tungsten oxide particles dispersion liquid was obtained in the same method as the method of the example 1, other than a point that the addition amount of the polymer compound (C) having the ester group was changed to 59.5 g (abbreviated as $\alpha''$ liquid hereinafter).

The $\alpha''$ liquid 10 g and the $\beta$ liquid 1 g explained in the example 1 were mixed, and the same operation as the operation of the example 1 was performed, to thereby obtain the dispersion. 0.35 pts.wt. of the polymer compound (C) having the ester group and 0.4 pts.wt. of the acrylic resin defloculating agent (D) were contained in the dispersion, with respect to 1 pts.wt. of the composite tungsten oxide particles (A).

The same operation as the operation of the example 1 was performed to the dispersion, to thereby obtain the laminated glass.

The optical characteristics of the laminated glass were evaluated in the same way as the example 1. The evaluation result is shown in table 1.

Example 9

The laminated glass was obtained by performing the same operation as the operation of the example 1, other than a point that the composite tungsten oxide particles (A1) was substituted with lanthanum hexaboride particles, being the hexaboride particles (A2), and the composite tungsten oxide particles (A1) was used so that the content in the dissolved material was 0.008 wt. %.

The optical characteristics of the laminated glass were evaluated in the same way as the example 1. The evaluation result is shown in table 2.

Note that the content of the hexaboride particles (A2) in the dissolved material was set to be 0.008 wt. %, to obtain 70% visible light transmittance of the obtained laminated glass. Also, the dispersion particle size of the hexaboride particles coated with the polymer compound (C) having the ester group was adjusted to be 50 nm by previously performing beads pulverization to a hexaboride material.

Example 10

The laminated glass was obtained by performing the same operation as the operation of the example 2, other than a point that the composite tungsten oxide particles (A1) was substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 11

The laminated glass was obtained by performing the same operation as the operation of the example 3, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 12

The laminated glass was obtained by performing the same operation as the operation of the example 4, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 13

The laminated glass was obtained by performing the same operation as the operation of the example 5, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 14

The laminated glass was obtained by performing the same operation as the operation of the example 6, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 15

The laminated glass was obtained by performing the same operation as the operation of the example 7, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 16

The laminated glass was obtained by performing the same operation as the operation of the example 8, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Example 17

The laminated glass was obtained by performing the same operation as the operation of the example 1, other than a point that adding the composite tungsten oxide particles (A1) dispersion was added to the ultraviolet ray curing resin precursor Uvekol A (by UCB Corporation) so that the content of the composite tungsten oxide particles was 0.04 wt. %, and further the hexaboride particles (A2) dispersion was added so that the content of the hexaboride particles was 0.004 wt. %, which were then dissolved therein, to thereby prepare the intermediate layer solution.

The optical characteristics of the laminated glass were evaluated in the same way as the example 1. The evaluation result is shown in table 3.

As the optical characteristics of the obtained laminated glass, haze (H), visible light transmittance T (unit: %), and solar light transmittance ST (unit: %) were evaluated. The evaluation result is shown in table 3.

Comparative Example 1

The laminated glass was obtained by performing the same operation as the operation of the example 1, other than a point that the deflocculating agent (D) was not added.

The optical characteristics of the laminated glass were evaluated in the same way as the example 1. The evaluation result is shown in table 1.

Comparative Example 2

The laminated glass was obtained by performing the same operation as the operation of the example 4, other than a point that the deflocculating agent (D) was not added.

The optical characteristics of the laminated glass were evaluated in the same way as the example 1. The evaluation result is shown in table 1.

Comparative Example 3

The laminated glass of 60×50×2 mm was obtained by performing the same operation as the operation of the example 1, other than a point that the polymer compound (C) having the ester group was not added.

The optical characteristics of the laminated glass were evaluated in the same way as the example 1. The evaluation result is shown in table 1.

Comparative Example 4

The laminated glass of 60×50×2 mm was obtained by performing the same operation as the operation of the example 5, other than a point that the polymer compound (C) having the ester group was not added.

The optical characteristics of the laminated glass were evaluated in the same way as the example 1. The evaluation result is shown in table 1.

Comparative Example 5

The laminated glass of 60×50×2 mm was obtained by performing the same operation as the operation of the example 1, other than a point that the acrylic polymer compound-based deflocculating agent (D) (JONCRYL611 by BASF) having compatibility with the methyl methacrylate explained in the example 1 was substituted with the acrylic polymer compound-based deflocculating agent (D) (UC-3910 by TOAGOSEI Co., Ltd.) which was insoluble in toluene, although having compatibility with the monomer mainly composed of methyl methacrylate.

The optical characteristics of the laminated glass were evaluated in the same way as the example 1. The evaluation result is shown in table 1.

Comparative Example 6

The laminated glass was obtained by performing the same operation as the operation of the comparative example 1, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Comparative Example 7

The laminated glass was obtained by performing the same operation as the operation of the comparative example 2, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Comparative Example 8

The laminated glass was obtained by performing the same operation as the operation of the comparative example 3, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Comparative Example 9

The laminated glass was obtained by performing the same operation as the operation of the comparative example 4, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

Comparative Example 10

The laminated glass was obtained by performing the same operation as the operation of the comparative example 5, other than a point that the composite tungsten oxide particles (A1) were substituted with lanthanum hexaboride particles, being the hexaboride particles (A2), and the composite tungsten oxide particles (A1) were used so that the content in the dissolved material was 0.008 wt. %.

The optical characteristics of the laminated glass were evaluated in the same way as the example 1. The evaluation result is shown in table 2.

TABLE 1

| | Composition of dispersion of particles of composite tungsten oxide | | | | Molding material | | | |
| | Polymer compound containing ester | | Deflocculating agent | | | Optical Characteristics | | |
| | Kind | Addition amount (pts. wt.) | Kind | Addition amount (pts. wt.) | Composition Content of oxide (Mass %) | Visible light transmittance (%) | Solar light transmittance (%) | Haze (%) |
| --- | --- | --- | --- | --- | --- | --- | --- | --- |
| Example 1 | S24000GR | 0.4 | Joncryl 611 | 2.6 | 0.08 | 70.4 | 34.8 | 0.8 |
| Example 2 | S24000GR | 0.4 | Joncryl 611 | 5.6 | 0.08 | 70.8 | 35.2 | 0.7 |
| Example 3 | S24000GR | 0.4 | Joncryl 611 | 0.46 | 0.08 | 70.1 | 34.5 | 0.7 |
| Example 4 | S32000 | 0.4 | Joncryl 611 | 2.6 | 0.08 | 71.2 | 35.6 | 0.7 |
| Example 5 | S24000GR | 0.4 | BR-116 | 2.6 | 0.08 | 74.7 | 39.0 | 0.6 |
| Example 6 | S24000GR | 4 | Joncryl 611 | 50 | 0.06 | 75.4 | 40.0 | 0.7 |
| Example 7 | S24000GR | 4 | Joncryl 611 | 55 | 0.06 | 74.5 | 38.6 | 1.8 |
| Example 8 | S24000GR | 0.35 | Joncryl 611 | 0.4 | 0.06 | 75.1 | 39.5 | 1.7 |
| Comparative Example 1 | S24000GR | 0.4 | — | — | 0.08 | 70.2 | 34.6 | 5.7 |
| Comparative Example 2 | S32000 | 0.4 | — | — | 0.08 | 69.5 | 33.9 | 7.4 |
| Comparative Example 3 | — | — | Joncryl 611 | 3.0 | 0.08 | 71.3 | 35.7 | 6.3 |
| Comparative Example 4 | — | — | BR-116 | 3.0 | 0.08 | 72.1 | 36.5 | 10.8 |
| Comparative Example 5 | S24000GR | 0.4 | UC-3910 | 2.6 | 0.08 | 71.5 | 35.9 | 7.3 |

TABLE 2

| | Composition of dispersion of hexaboride particles | | | | | | | |
|---|---|---|---|---|---|---|---|---|
| | Polymer compound containing ester | | Deflocculating agent | | Molding material | | | |
| | | | | | Composition | Optical characteristics | | |
| | Kind | Addition amount (pts. wt.) | Kind | Addition amount (pts. wt.) | Content of hexabride particles (Mass %) | Visible light transmittance (%) | Solar light transmittance (%) | Haze (%) |
| Example 9 | S24000GR | 0.4 | Joncryl 611 | 2.6 | 0.008 | 70.4 | 45.3 | 0.5 |
| Example 10 | S24000GR | 0.4 | Joncryl 611 | 5.6 | 0.008 | 70.8 | 44.9 | 0.4 |
| Example 11 | S24000GR | 0.4 | Joncryl 611 | 0.46 | 0.008 | 70.8 | 45.5 | 0.5 |
| Example 12 | S32000 | 0.4 | Joncryl 611 | 2.6 | 0.008 | 71.1 | 45.1 | 0.6 |
| Example 13 | S24000GR | 0.4 | BR-116 | 2.6 | 0.008 | 71.0 | 44.8 | 0.4 |
| Example 14 | S24000GR | 4 | Joncryl 611 | 50 | 0.006 | 74.8 | 52.1 | 0.4 |
| Example 15 | S24000GR | 4 | Joncryl 611 | 55 | 0.006 | 75.2 | 51.3 | 0.5 |
| Example 16 | S24000GR | 0.35 | Joncryl 611 | 0.4 | 0.006 | 74.9 | 51.5 | 0.4 |
| Comparative example 6 | S24000GR | 0.4 | — | — | 0.008 | 69.5 | 45.1 | 6.1 |
| Comparative example 7 | S32000 | 0.4 | — | — | 0.008 | 71.1 | 44.8 | 7.1 |
| Comparative example 8 | — | — | Joncryl 611 | 3.0 | 0.008 | 71.9 | 45.6 | 6.5 |
| Comparative example 9 | — | — | BR-116 | 3.0 | 0.008 | 71.5 | 44.9 | 13.7 |
| Comparative example 10 | S24000GR | 0.4 | UC-3910 | 2.6 | 0.008 | 71.0 | 45.5 | 8.0 |

TABLE 3

| | Composition of composite tungsten oxide and hexabride particles | | | | Molding material | | | | |
|---|---|---|---|---|---|---|---|---|---|
| | Polymer compound containing ester | | Deflocculating agent | | Composition | | Optical characteristics | | |
| | Kind | Addition amount (pts. wt.) | Kind | Addition amount (pts. wt.) | Content of oxide (Mass %) | Content of hexabride particles (Mass %) | Visible light transmittance (%) | Solar light transmittance (%) | Haze (%) |
| Example 17 | S24000GR | 0.4 | Joncryl 611 | 2.6 | 0.04 | 0.004 | 70.4 | 40.2 | 0.5 |

What is claimed is:

1. A heat ray shielding laminated glass, with an intermediate layer having a heat ray shielding performance interposed between opposed two plate glasses,
wherein an intermediate layer having the heat ray shielding performance is obtained by being cured by irradiation of ultraviolet ray, after a dispersion of composite tungsten oxide particles (A1) and/or hexaboride particles (A2) is dissolved into an ultraviolet ray curing resin precursor (E) and thereafter is filled in a gap between the opposed two plate glasses, the composite tungsten oxide particles (A1) and/or the hexaboride particles (A2) being manufactured by the steps of:

obtaining slurry by dispersing into a hydrocarbon solvent (B), the composite tungsten oxide particles (A1) expressed by a general formula $M_xW_yO_z$ (wherein M is H, alkali metal, alkali earth metals, rare earth elements, one kind or more elements selected from the group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, wherein W is tungsten, O is oxygen, satisfying $0.001 \leq x/y \leq 1$, $2.2 < z/y \leq 3.0$), and/or the hexaboride particles (A2) expressed by a general formula $XB_6$ (wherein element X is at least one kind or more elements selected from the group consisting of La, Ce, Pr, Nd, Gd, Tb, Dy, Ho, Y, Sm, Eu, Er, Tm, Yb, Lu, Sr and Ca);

obtaining a dispersion liquid of the composite tungsten oxide particles (A1) and/or the hexaboride particles (A2), with each surface coated with a polymer compound (C) having an ester group, by adding the polymer compound (C) having the ester group, to the slurry and thereafter pulverizing the polymer compound (C);

obtaining the dispersion of the composite tungsten oxide particles (A1) and/or the hexaboride particles (A2) by adding a deflocculating agent (D) to the dispersion liquid and thereafter the hydrocarbon solvent (B) is evaporated from the dispersion liquid; and pulverizing the dispersion of the composite tungsten oxide particles (A1) and/or the hexaboride particles (A2) in parallel to vaporizing the hydrocarbon solvent (B) or after vaporizing the hydrocarbon solvent (B), wherein:
the polymer compound (C) with the ester group is a graft copolymer with a poly(carbonyl alkylene oxy) chain as a side chain and an amino group in a molecular structure, the poly(carbonyl alkylene oxy) chain being composed of 6-hydroxy hexanoic acid and at least one kind of hydroxyl carboxylic acid selected from ricinoleic acid, 12-hydroxy stearic acid, 12-hydroxydodecanoic acid, 5-hydroxydecanoic acid, and 4-hydroxydodecanoic acid, as recurring units, the deflocculating agent (D) is an acrylic polymer compound soluble in the hydrocarbon solvent (B) and having compatibility with a ultraviolet ray curing resin precursor (E), the deflocculating agent (D) being a copolymer of (meth) acrylic acid 1-13C (meth) acrylic acide alkyl ester, and styrene, and an addition amount of the deflocculating agent (D) is 1.14 to 14 pts.wt. with respect to 1 pts.wt. of the polymer compound (C) having the ester group, and the ultraviolet ray curing resin precursor (E) is cured by being irradiated with ultraviolet rays, and contains raw materials of monofunctional monomer, multi-functional monomer, photopolymerization initiator, poly epoxy polyacrylate, polyurethane acrylate, and a silane compound.

2. The heat ray shielding laminated glass according to claim 1, wherein a dispersion particle size of the composite tungsten oxide particles (A1) and/or the hexaboride particles (A2) is 500 nm or less.

3. The heat ray shielding laminated glass according to claim 1, wherein a solubility parameter of the hydrocarbon solvent (B) is 8.5 to 9.1 $(cal/cm^3)^{1/2}$.

4. The heat ray shielding laminated glass according to claim 1, wherein an addition amount of the polymer compound (C) with the ester group is 0.01 pts.wt. to 5 pts.wt., with respect to 1 pts.wt. of the composite tungsten oxide particles (A1) and/or the hexaboride particles (A2).

5. The heat ray shielding laminated glass according to claim 1, wherein an addition amount of the deflocculating agent (D) is 0.46 to 50 pts.wt., with respect to 1 pts.wt. of the composite tungsten oxide particles (A1) and/or the hexaboride particles (A2).

6. The heat ray shielding laminated glass according to claim 1, wherein an addition amount of the deflocculating agent (D) is 1.0 to 50 pts.wt., with respect to 1 pts.wt. of the composite tungsten particles (A1) and/or the hexaboride particles (A2).

7. The heat ray shielding laminated glass, being the laminated glass according to claim 1, wherein a haze is 5% or less when a visible light transmittance of the laminated glass is set to 50% or more.

8. The heat ray shielding laminated glass according to claim 1, wherein the monofunctional monomer contained in the ultraviolet ray curing resin precursor (E) comprises monofunctional (meth)acrylate, (meth)acrylic acid, methyl(meth)acrylate, ethyl(meth)acrylate, propyl(meth)acrylate, n-butyl (meth)acrylate, t-butyl(meth)acrylate, isobutyl(meth)acrylate, 2-ethylhexyl(meth)acrylate, nonyl(meth)acrylate, tridecyl(meth)acrylate, hexadecyl(meth)acrylate, octadecyl (meth)acrylate, isoamyl(meth)acrylate, 2-hydroxyethyl (meth)acrylate, 3-chloro-2-hydroxypropyl(meth)acrylate, methoxyethyl(meth)acrylate, butoxyethyl(meth)acrylate, benzyl(meth)acrylate, nonylphenoxyethyl(meth)acrylate, tetrahydrofurfuryl(meth)acrylate, glycidyl(meth)acrylate, 2-hydroxy-3-phenoxypropyl(meth)acrylate, nonylphenoxy-ethyltetrahydrofurfuryl(meth)acrylate, caprolactone modified tetrahydrofurfuryl(meth)acrylate, acryloyl morpholine, phenoxyethyl(meth)acrylate, carbonylethylacrylate, isobornyl(meth)acrylate, norbornyl(meth)acrylate, 2-(meth)acryloyloxymethyl-2-methylbicycloheptaneadamantyl (meth)acrylate, dicyclopentenyl(meth)acrylate, dicyclopentanyl(meth)acrylate, dicyclopentenyloxyethyl(meth) acrylate, tetracyclodecanyl(meth)acrylate, cyclohexyl(meth)acrylate, 2-(2-ethoxyethoxy)ethylacrylate, 1,6-hexanedioldiacrylate, pentaerytrotyltriacrylate(PETIA), or trimethylolpropanetriacrylate(TMPTA).

9. The heat ray shielding laminated glass according to claim 1, wherein the multi-functional monomer contained in the ultraviolet ray curing resin precursor (E) comprises 1,4-butanedioldi(meth)acrylate, 1,6-hexandioldi(meth)acrylate, neopentylglycoldi(meth)acrylate, 2-methyl-1,8-octanediol di(meth)acrylate, 2-butyl-2-ethyl-1,3-propanediol di(meth)acrylate, ethylene glycoldi(meth)acrylate, polypropyleneglycoldi(meth)acrylate, di(meth)acrylate obtained by adding 4 mol or more of ethylene oxide or propylene oxide to 1 mol neopentylglycol, ethylene oxide modified phosphoric acid (meth)acrylate, ethylene oxide modified alkyl phosphoric acid(meth)acrylate, diethylene glycoldi(meth)acrylate, dipropylne glycoldi(meth)acrylate, tripropylene glycoldi (meth)acrylate, polyether(meth)acryklate, eidthyl aminoethyl(meth)acrylate, N-vinylpyrrolidone, N-vinylcaprolactam, vinylethermonomer, di(meth)acrylate obtained by adding 2 mol ethylene oxide or propylene oxide to norbornanedimethanol, tricyclodecanedimethanoldi(meth)acrylate, tricyclodecanediethanoldi(meth)acrylate, di(meth)acrylate obtained by adding 2 mol ethylene oxide or propylene oxide to tricyclodecanedimethanol, pentacyclopentadecanedimethanoldi(meth)acrylate, pentacyclopentadecanedi-ethanoldi(meth)acrylate, di(meth)acrylate obtained by adding 2 mol ethylene oxide or propylene oxide to pentacyclopentadecanedimethanol, di(meth)acrylate of diol obtained by adding 2 mol ethylene oxide or propylene oxide to pentacyclopentadecanediehtanol, or dimethyloldicyclo-pentanedi(meth)acrylate.

10. The heat ray shielding laminated glass according to claim 1, wherein the photopolymerization initiator contained in the ultraviolet ray curing resin precursor (E) comprises benzoinisobutylether, 2,4-diethyloxanthone, 2-isobutylether, 2,4-diethylthioxanthone, 2-isopropylthioxanthone, benzyl, 1-hydroxycyclohexylphenylketone, benzomethylether, benzildimethylketal, 2-hydroxy-2-methyl-1-phenylpropane-1-one, 1-(4-isopropylphenyl)-2-hydroxy-2-methylpropane-1-one, 2-methyl-1-(4-methyl thiophenyl)-2-morpholinopropane-1-one, benzophenone, 4-phenylbenzophenone, isophthalphenone, or 4-benzoyl-4'-methyl-diphenyl sulfide.

11. The heat ray shielding laminated glass according to claim 1, wherein the poly epoxy polyacrylate contained in the ultraviolet ray curing resin precursor (E) comprises bisphenol A-type epoxy resin, bisphenol F-type epoxy resin, phenol-novolac-type epoxy resin, terminal glycidylether being bisphenol A-type propyleneoxide adduct, a reactant of epoxy resin and (meth)acrylic acid, polyesterpoly(meth)acrylate, 2-hydroxyethyl(meth)acryolate, 2-hydroxypropyl(meth)acrylate, phenoxyethyl(meth)acrylate, phenyloxypolyetoxy (meth)acrylate, 2-hydroxy-3-phenyloxypropyl(meth)acrylate, isobornyl(meth)acrylate, dicyclopentanyl(meth) acrylate, ethyleneglycoldi(meth)acrylate, polyethyleneglycoldi(meth)acrylate, 1,6-hexandioldi(meth) acrylate, 1,9-nonanedioldi(meth)acrylate, trimethyrolpropanetri(meth)acrylate, bisphenolApolyetoxydi(meth)acrylate, bisphenolApolypropoxydi(meth)acrylate, bisphenolFpolyethoxydi(meth)acrylate, o-phenylphenyloxyethyl(meth)acrylate, o-phenylphenyloxypolyethoxy(meth)acrylate, or tribromophenyloxyethyl(meth)acrylate.

12. The heat ray shielding laminated glass according to claim 1, wherein the polyurethane acrylate contained in the ultraviolet ray curing resin precursor (E) comprises a reactant of polyol, organic polyisocyanate, and ethylenic unsaturated compound containing a hydroxyl group or a reactant of the organic polyisocyanate and the ethylenic unsaturated compound containing a hydroxyl group;

the polyol being ethyleneglycol, 1,4-butanediol, neopentylglycol, 2-ethyl-2-butyl-1,3-propanediol, polycaprolactonepolyol, polyethyleneglycol, polytetramethyleneglycol, polyesterpolyol, polycaprolactonepolyol, polyethylenglycol, polytetramethyleneglycol, polyester polyol, polycarbonatediol;

the organic polyisocyanates being tolylene diisocyanate, isophorone diisocyanate, hexamethylene diisocyanate, trimethylhexamethylene diisocyanate, 6-caprolactone adduct of 2-hydroxyethyl(meth)acrylate, 2-hydroxypropyl(meth)acrylate, 4-hidoxybutyl(meth)acrylate, 2-hydroxyethyl(meth)acrylate;

the ethylenic unsaturated compound containing a hydroxyl group being pentaerythritoltri(meth)acrylate.

13. The heat ray shielding laminated glass according to claim 1, wherein the silane compound contained in the ultraviolet ray curing resin precursor (E) comprises γ-aminopropylmethoxysilane, γ-aminopropylethoxysilane, N-β(aminoethyl)-γ-aminopropyltrimethoxysilane, N-β(aminoethyl)-γ-aminopropylmethyldimethoxysilane, N-phenyl-γ-aminopropyltrimethoxysilane, γ-anilinopropyltrimethoxysilane, γ-dibutylaminopropyltrimethoxysilane, γ-ureidopropyltriethoxysilane, N-β(N-vinylbenzilaminoethyl)-γ-aminopropyltrimethoxysilane-hydrochloride, γ-methacryloxypropyltrimethoxysilane, γ-methacryloxypropyltriethoxysilane, vinyltrimethoxysilane, vinyltriethoxysilane, vinyltrichlorosilane, vinyltris(β-methoxyethoxy)silane, γ-glycidoxypropylmethyldiethoxysilane, γ-glycidoxypropyltriethoxysilane, γ-(3,4-epoxycyclohexyl)ethyltrimethoxysilane, γ-glycidoxypropyltrimethoxysilane, γ-mercaptopropyltrimethoxysilane, chloropropyltrimethoxysi lane, trimethylchlorosilane, hexamethyldisilazane, N-trimethylsilylimidazole, bis(trimethylsilyl)urea, trimethylsilylacetamide, bistrimethylsilylacetamide, trimethylsilylisocianate, trimethylmethoxysilane, trimethylethoxysilane, methyltrimethoxysilane, methyltriethoxysilane, dimethyldimethoxysilane, dimethyldiethoxysilane, t-butyldimethylchlorosilane, t-butyldiphenylchlorosilane, triisopropylchlorosilane, n-propyltrimethoxysilane, isobutyltrimethoxysilane, n-hexyltrimethoxysilane, n-decyltrimethoxysilane, n-hexadecyltrimethoxysialne, 1,6-bis(trimethoxysilyl)hexan, dimethylsilyldiisocianate, methylsilyltriisocyanate, phenyltrimethoxysilane, diphenyldimethoxysilane, or phenylsilyltriisocianate.

14. A manufacturing method of the heat ray shielding laminated glass according to claim 1, comprising the steps of:

dissolving the dispersion of the composite tungsten oxide particles (A1) and/or the hexaboride particles (A2), containing the composite tungsten oxide particles (A1) and/or the hexaboride particles (A2), an ester-based polymer compound (C), and a deflocculating agent (D), into the ultraviolet ray curing resin precursor (E); and thereafter filling the ultraviolet ray curing resin precursor (E) in the gap between opposed two plate glasses, which is then irradiated with ultraviolet ray.

* * * * *